United States Patent [19]

Chang

[11] Patent Number: 5,768,376
[45] Date of Patent: Jun. 16, 1998

[54] VIDEO SIGNAL SCRAMBLING APPARATUS

[75] Inventor: Dong Hyun Chang, Suwon, Rep. of Korea

[73] Assignee: Samsung Electro-Mechanics Co., Ltd., Suwon, Rep. of Korea

[21] Appl. No.: 692,728

[22] Filed: Aug. 6, 1996

[30] Foreign Application Priority Data

Oct. 25, 1995 [KR] Rep. of Korea ............... 95-36994

[51] Int. Cl.[6] .......................................... H04N 7/171
[52] U.S. Cl. ............................................... 380/15; 380/20
[58] Field of Search .................................... 380/15, 20

[56] References Cited

U.S. PATENT DOCUMENTS

| | | | |
|---|---|---|---|
| 5,142,575 | 8/1992 | Farmer et al. | 380/15 |
| 5,161,188 | 11/1992 | Pires | 380/15 |
| 5,177,787 | 1/1993 | Murphy et al. | 380/17 |
| 5,402,488 | 3/1995 | Karlock | 380/5 |
| 5,410,601 | 4/1995 | Hashimoto | 380/14 |
| 5,438,620 | 8/1995 | Ryan et al. | 380/15 |

*Primary Examiner*—Gilberto Barrón, Jr.
*Attorney, Agent, or Firm*—Ladas & Parry

[57] ABSTRACT

A video signal scrambling apparatus which scrambles a video signal in a cable or commercial broadcasting system to prevent nonsubscribers from viewing the signal and the unwarranted descrambling of the signal. The scrambling apparatus scrambles the video signal in such a manner that a predetermined period of a sync signal is selectively inverted and attenuated, and then an artificial sync signal is inserted into the video signal in which the sync signal is inverted and attenuated, causing the horizontal sync period to be irregular.

7 Claims, 9 Drawing Sheets

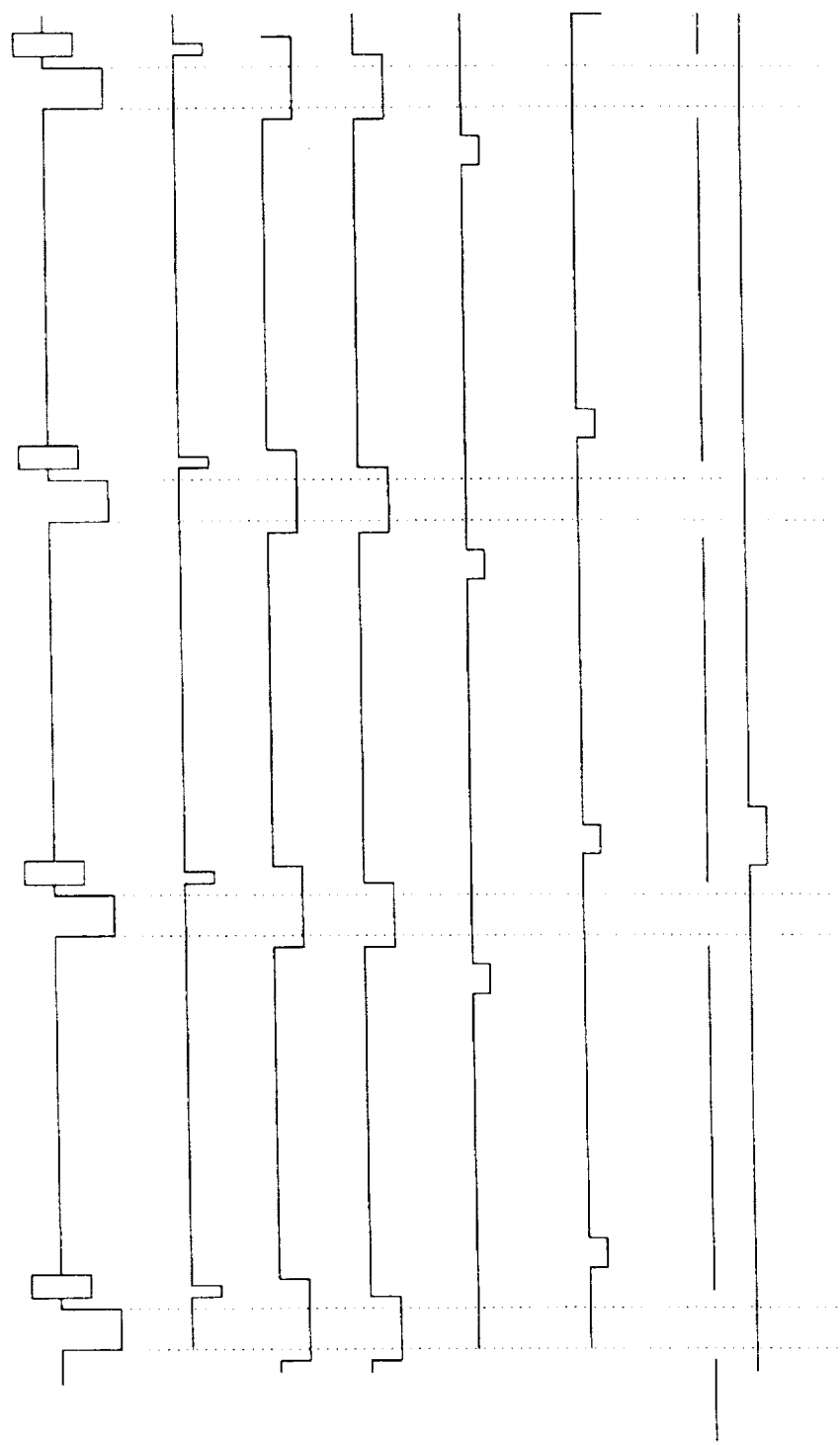

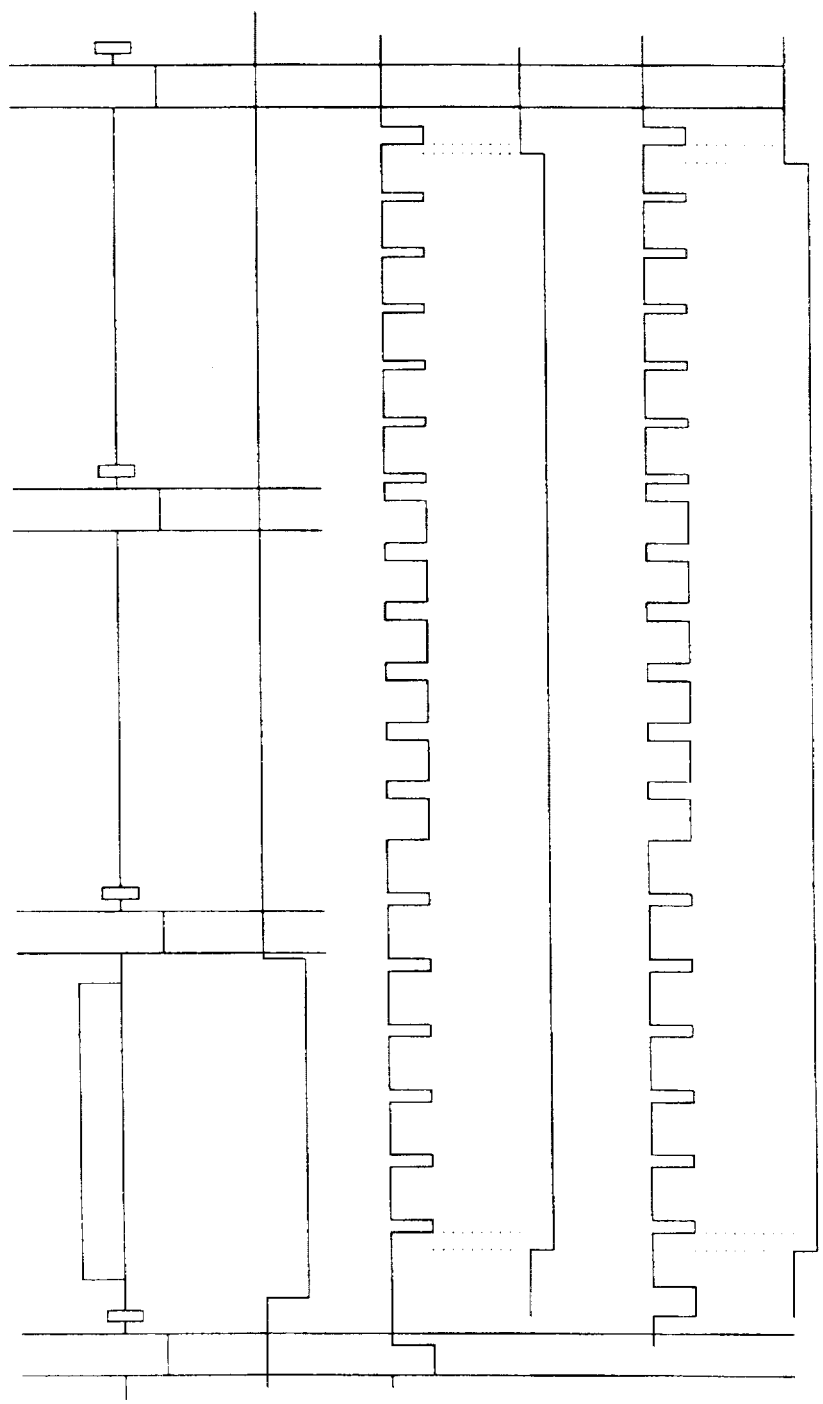

VIDEO SIGNAL SCRAMBLING APPARATUS

BACKGROUND OF THE INVENTION

1. Field of the Invention

The present invention relates to an apparatus for scrambling video signals, and more particularly to an apparatus which scrambles a video signal in a cable or commercial broadcasting system by attenuating a sync signal of the video signal and/or by inserting an artificial sync signal to the video signal, so that nonsubscribers having no decoder for descrambling the scrambled signal are prevented from obtaining the benefit or enjoyment of the scrambled signal.

2. Description of the Prior Art

A conventional video signal scrambling apparatus is shown in FIG. 1. Referring to FIG. 1, the conventional video signal scrambling apparatus comprises a modulator 100 for modulating an input video signal to a video and audio intermediate frequency (IF) signal, a switching section 101 for attenuating a sync signal of the modulated video IF signal, and a logic circuit section 104 for providing a switch-timing pulse signal to the switching section 101 under the control of a microcomputer 102 or a remote control section 103.

According to the conventional video signal scrambling apparatus as constructed above, the input video signal is modulated to a video and audio IF signal by the modulator 100, and the horizontal sync signal of the modulated video IF signal is scrambled by attenuation by the timing pulse signal provided from the switching section 101 and the logic circuit section 104. The logic circuit section 104 produces the timing pulse signal based on the sync signal of the input video signal and provides the pulse signal to the switching section.

The timing information on the attenuation period is amplitude-modulated by the carrier of the audio IF signal to be transmitted as a high frequency signal.

The conventional video signal scrambling apparatus, however, has drawbacks in that the video signal scrambled thereby may be easily descrambled by any unwarranted descrambler or decoder since such a sync signal suppression type scrambling as in the conventional apparatus, whereby the sync signal of the video IF signal is merely attenuated, is well known in the art. In other words, if the attenuated sync signal of the video IF signal is recovered to the original sync signal in the receiver, the scrambled video signal can be easily descrambled and viewed.

SUMMARY OF THE INVENTION

The present invention has been made to solve the problems involved in the prior art. Therefore, it is an object of the present invention to provide a video signal scrambling apparatus which scrambles the video signal in a cable or commercial broadcasting system by irregulating the period of the horizontal sync signal of the video signal by attenuation of the sync signal or by insertion of an artificial sync signal, thereby preventing nonsubscribers from obtaining the benefit or enjoyment of the scrambled signal or the unwarranted descrambling of the scrambled signal.

It is another object of the present invention to provide a video signal scrambling apparatus which can provide selective video services to subscribers by inserting an artificial sync signal to the video signal to be scrambled.

In order to achieve the above objects, the present invention provides a video signal scrambling apparatus comprising:

an automatic gain control and sync corrector for controlling a gain of an input video signal and maintaining a sync signal of said video signal constant;

a sync separator for separating a horizontal/vertical sync signal from said video signal provided from said automatic gain control and sync corrector;

logic circuit means for producing a video selection signal and control signals in response to said sync signal provided from said sync separator;

sample-hold means for sampling and holding said video signal provided from said automatic gain control and sync corrector in accordance with said control signals provided from said logic circuit means to maintain a DC offset of said video signal constant;

a multi-level shifter and inverter for inverting or level-shifting said sync signal of said video signal provided from said sample-hold means in accordance with said control signals provided from said logic circuit means;

a sync signal attenuator and selector for level-shifting said sync signal of said video signal provided from said multi-level shifter and inverter by attenuation or conversion of said sync signal;

a multiple artificial sync generator for generating and inserting an artificial sync signal into said video signal provided from said sync signal attenuator and selector;

a multiplexer for inserting information for descrambling said video signal outputted from said multiple artificial sync generator and terminal control information provided from said logic circuit means into said video signal outputted from said multiple artificial sync generator;

a low-pass filter for filtering said video signal provided from said multiplexer to remove noise components from said video signal; and amplifying means for non-inversion-amplifying said video signal provided from said low-pass filter to provide said amplified video signal as a scrambled video signal.

BRIEF DESCRIPTION OF THE DRAWINGS

The above object, other features and advantages of the present invention will become more apparent by describing the preferred embodiment thereof with reference to the accompanying drawings, in which:

FIGS. 5A to 5M are waveform diagrams explaining the operation of the present invention.

FIGS. 7A to 7F are waveform diagrams illustrating the inverted sync signals in accordance with the present invention, wherein FIGS. 7A to 7C show the inverted sync signals in a wide mode, and FIGS. 7D to 7F show the inverted sync signals in a narrow mode.

DETAILED DESCRIPTION OF THE PREFERRED EMBODIMENT

Figure 1:
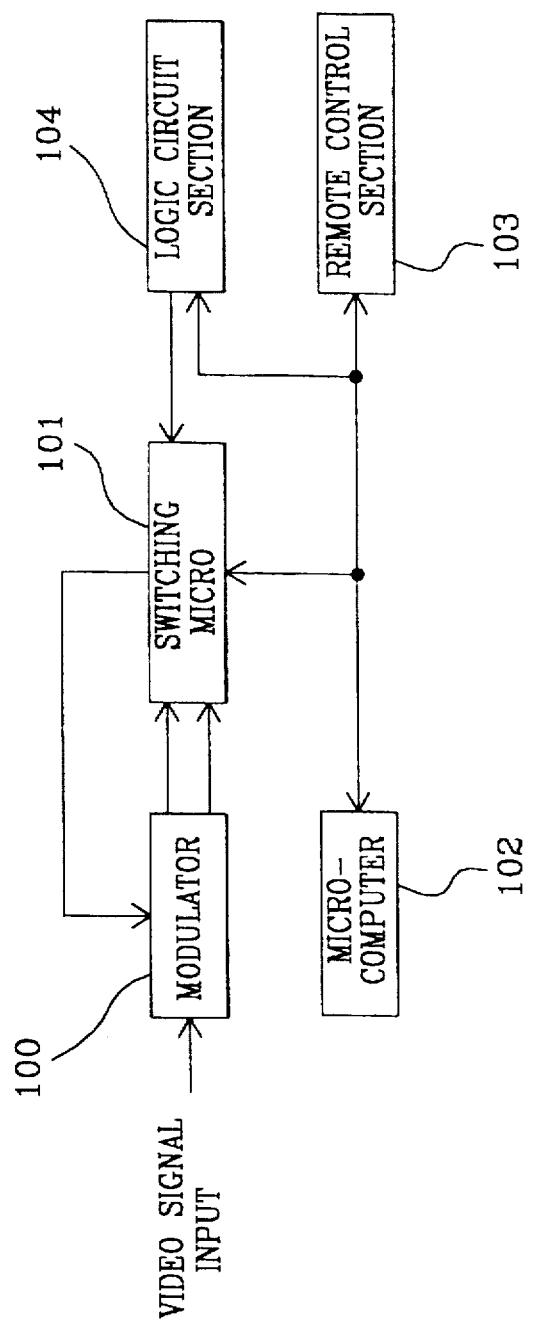
FIG. 1 is a block diagram of a conventional video signal scrambling apparatus.
Figure 2:
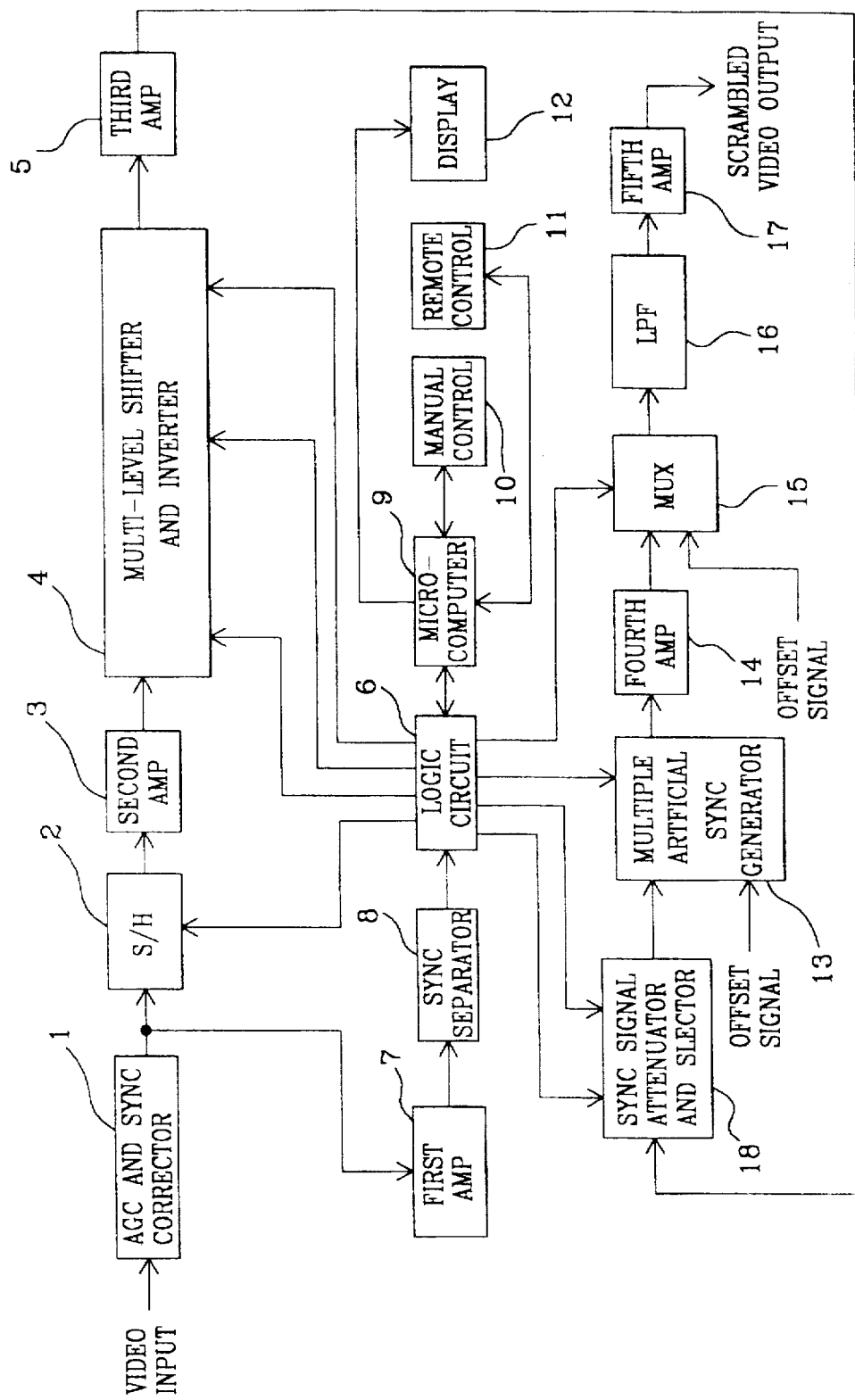
FIG. 2 is a block diagram of the video signal scrambling apparatus according to the present invention.

FIG. 2 is a block diagram of the video signal scrambling apparatus according to the present invention. Referring to FIG. 2, the video signal scrambling apparatus is provided with an automatic gain control (AGC) and sync corrector 1 for controlling a gain of an input video signal and maintaining a sync signal of the video signal constant, a first amplifying section 7 for non-inversion-amplifying the video signal from the AGC and sync corrector 1, a sync separator 8 for separating the horizontal/vertical sync signal from the video signal provided from the first amplifying section 7, a logic circuit section 6 for producing a video selection signal, control signals, and information data for descrambling, a scrambled video signal in response to the sync signal provided from the sync separator 8, a microcomputer 9 for controlling the logic circuit section 6 under the control of a manual control section 10 or a remote control section 11, and displaying the scrambled state on a display section 12, a sample-hold section 2 for sampling and holding the video signal provided from the AGC and sync corrector 1 in accordance with the control signals provided from the logic circuit section 6 to maintain a DC offset of the video signal constant, a second amplifying section 3 for amplifying the output of the sample-hold section 2, a multi-level shifter and inverter 4 for inverting the horizontal sync signal or the horizontal sync signal and a color burst signal of the video signal provided from the second amplifying section 3 in accordance with the control signals provided from the logic circuit section 6, a third amplifying section 5 for non-inversion-amplifying the output signal of the multi-level shifter and inverter 4, a sync signal attenuator and selector 18 for level-shifting the sync signal of the video signal provided from the third amplifier 3 by attenuation or conversion of the sync signal, a multiple artificial sync generator 13 for generating and inserting an artificial sync signal into the video signal provided from the sync signal attenuator and selector 18, a fourth amplifying section 14 for non-inversion-amplifying the output signal of the multiple artificial sync generator 13, a multiplexer 15 for inserting information obtained from the logic circuit section 6 for descrambling the scrambled video signal and terminal control information into the video signal outputted from the fourth amplifying section 4, a low-pass filter 16 for filtering the video signal provided from the multiplexer 15 to remove noise components from the video signal, and a fifth amplifying section 17 for non-inversion-amplifying the video signal provided from the low-pass filter 16 to provide the amplified video signal as a scrambled video signal.

Figure 3:
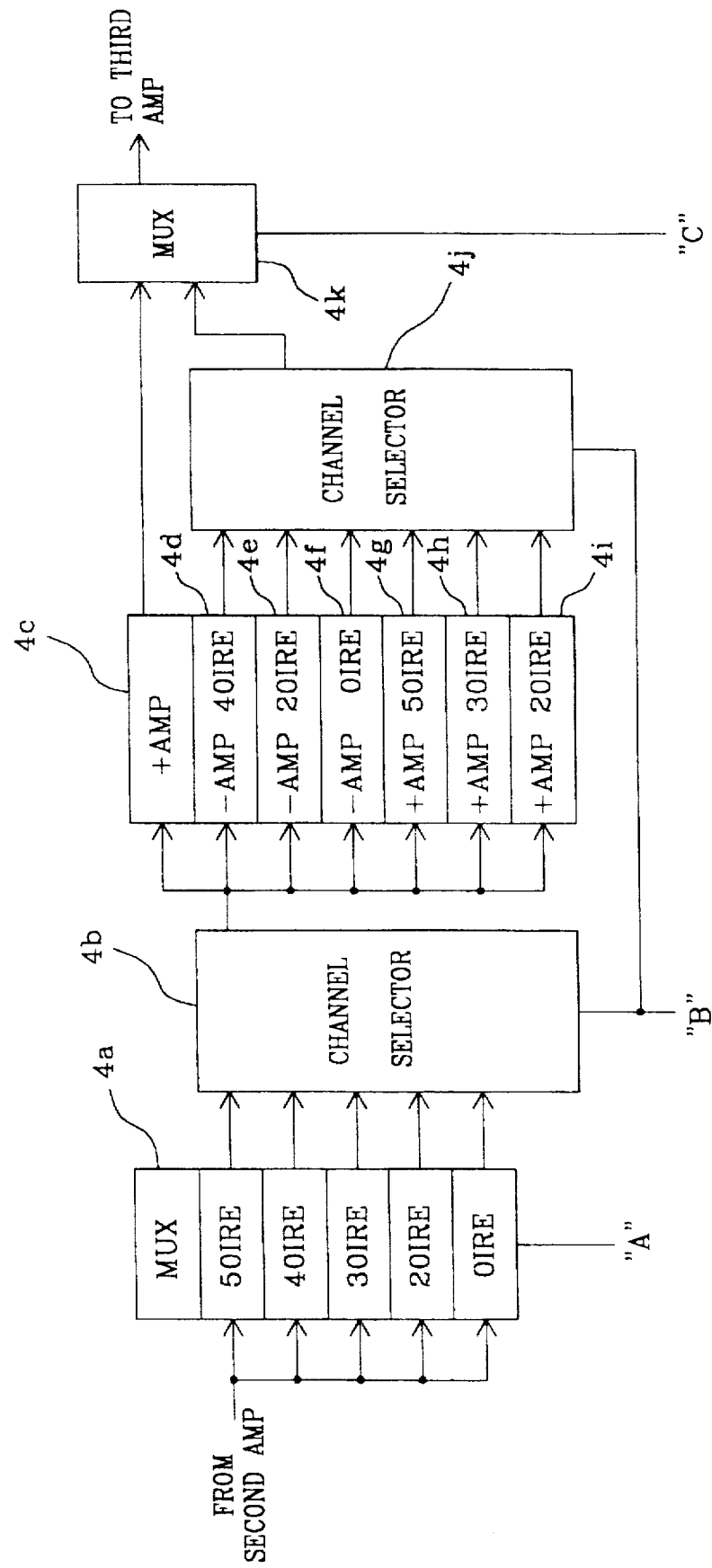
FIG. 3 is a schematic circuit diagram of the multi-level shifter and inverter in the apparatus of FIG. 2.

Referring to FIG. 3, the multi-level shifter and inverter 4 comprises a multistage multiplexer 4a for inserting reference signals into predetermined lines of the video signal outputted from the second amplifying section 3, respectively, a first channel selector 4b for selecting one of output signals of the multistage multiplexer 4a, a first amplifier 4c for amplifying and buffering an output signal of the first channel selector 4b, second to seventh amplifiers 4d to 4i for amplifying an output signal of the first channel selector 4b with offset-adjusted amplification factors, respectively, a second channel selector 4j for selecting one of output signals of the second to seventh amplifiers 4d to 4i, and a multiplexer 4k for level-shifting or inverting output signals of the first amplifier 4c and the second channel selector 4j in accordance with a video selection signal provided from the logic circuit section 6.

Figure 4:
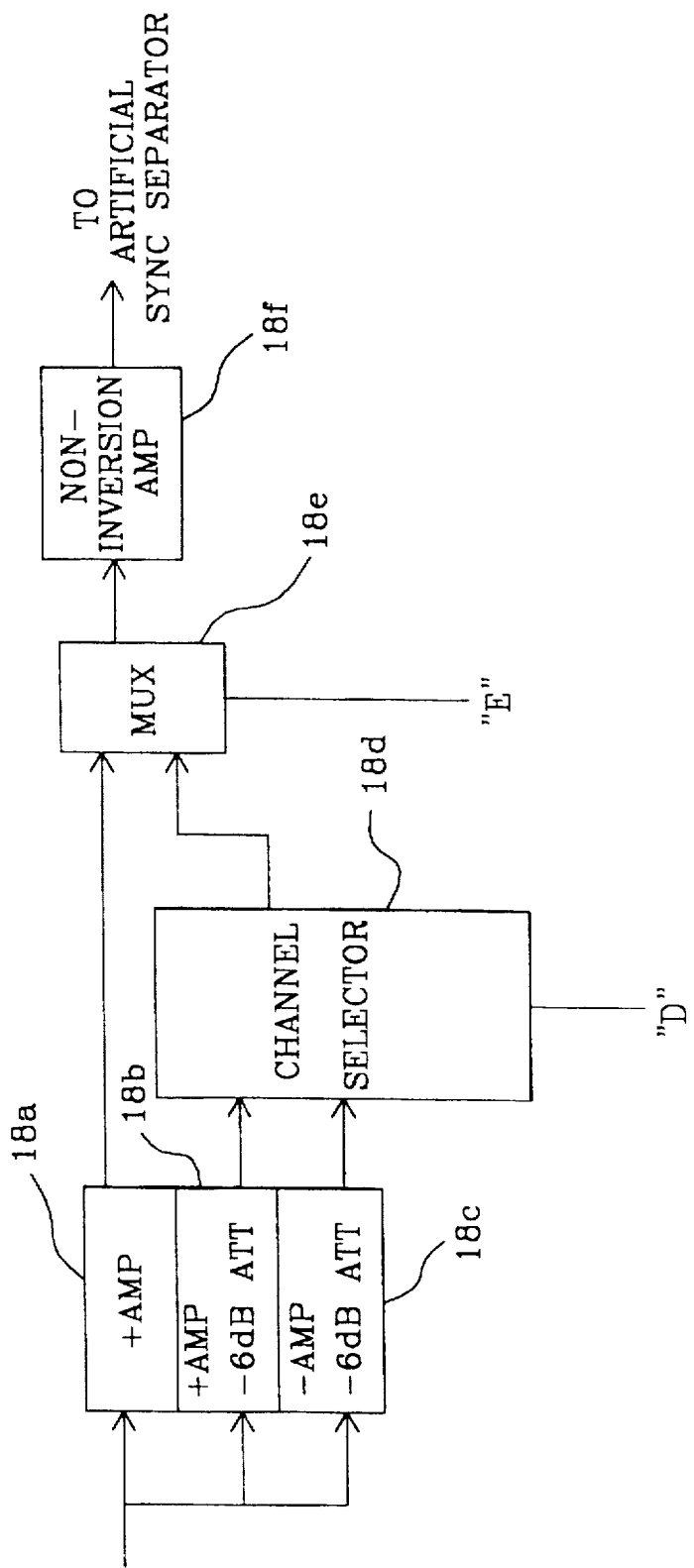
FIG. 4 is a schematic circuit diagram of the sync signal attenuator and selector in the apparatus of FIG. 2.

Referring to FIG. 4, the sync signal attenuator and selector 18 comprises first to third amplifiers 18a to 18c for amplifying the video signal outputted from the third amplifying section 5 with predetermined amplification factors to selectively attenuate the video signal, a channel selector 18d for selecting one of the video signals respectively, attenuated and outputted from the second and the third amplifiers 18b and 18c, a multiplexer 18e for selecting one of the output signal of the first amplifier 18a and the output signal of the channel selector 18d in accordance with the video selection signal outputted from the logic circuit section 6, and a fourth amplifier 18f for non-inversion-amplifying the output signal of the multiplexer 18e.

The operation of the video signal scrambling apparatus according to the present invention as described above will be explained.

First, if a video signal as shown in FIG. 5A is inputted to the AGC and sync corrector 1, the AGC and sync corrector 1 controls the gain of the input video signal to be 2Vp-p and controls the size of the sync signal of the gain-controlled video signal to be 40IRE, to provide the controlled video signal to the sample-hold section 2 and to the first amplifying section 7.

The first amplifying section 7 non-inversion-amplifies the video signal inputted thereto to provide the amplified video signal to the sync separator 8. The sync separator 8 separates the horizontal/vertical sync signal from the video signal and provides the separated sync signal to the logic circuit section 6.

The logic circuit section 6 generates the video selection signal, control signals, and information signal for descrambling the scrambled video signal in accordance with the horizontal/vertical sync signal as a reference signal. At this time, the microcomputer 9 controls the logic circuit section 6 under the control of the manual control section 10 or the remote control section 11, as well as it commonly owns the information and controls the display section 12 so that the information is displayed on the display section 12.

Meanwhile, the sample-hold section 2 samples and holds the video signal outputted from the AGC and sync corrector 1 in accordance with a sampling period and a hold control signal provided from the logic circuit section 6 to output to the second amplifying section 3 a video intermediate frequency of which the DC offset is maintained constant.

The second amplifying section 3 amplifies the video intermediate frequency and provides the amplified video intermediate frequency to the multi-level shifter and inverter 4. The multi-level shifter and inverter 4 inserts a reference signal into each field of the video signal outputted from the sample-hold section 2 in accordance with the control signals provided from the logic circuit section 6. The output video signal of the multi-level shifter and inverter 4 is inputted to the third amplifying section 5.

Here, the operation of the multi-level shifter and inverter 4 will now be explained in detail.

In the multi-level shifter and inverter 4 as shown in FIG. 3, the multistage multiplexer 4a inserts the reference signals 0IRE, 20IRE, 30IRE, 40IRE, and 50IRE into spefific lines for each field of the video signal outputted from the second amplifying section 3. The level of the reference signal coincides with the offset level of the first to seventh amplifiers 4c to 4i, and thus will be used as a reference signal during descrambling the video signal to reversely compensate for the output of the channel selector 4i.

The six video signals, into which lines the respective reference signals are inserted, are inputted to the channel selector 4b, and one of the six video signals is selected by and outputted from the channel selector 4b in accordance with the selection signal "B" provided from the logic circuit section 6.

The video signal selected by the first channel selector 4b is then inputted to the first to seventh amplifiers 4c to 4i, and the first to seventh amplifiers 4c to 4i amplify the video signal with respective offset-adjusted amplification factors.

Here, the first amplifier 4c is a buffer amplifier with a amplification factor of 1, the second amplifier 4d is an inversion amplifier for inversion-amplifying the video signal in which the reference signal of 40IRE is inserted, the third amplifier 4e is an inversion amplifier for inversion-amplifying the video signal into which the reference signal of 20IRE is inserted, the fourth amplifier 4f is an inversion amplifier for inversion-amplifying the video signal into which the reference signal of 0IRE is inserted, the fifth amplifier 4g is a non-inversion amplifier for non-inversion-amplifying the video signal into which the reference signal of 50IRE is inserted, the sixth amplifier 4h is a non-inversion amplifier for non-inversion-amplifying the video signal into which the reference signal of 30IRE is inserted, and the seventh amplifier 4i is a non-inversion amplifier for non-inversion-amplifying the video signal into which the reference signal of 20IRE is inserted.

Meanwhile, the video signal buffered in the first amplifier 4c is directly inputted to the multiplexer 4k, and the video signals which are non-inverted or inverted, and offset-adjusted by the second to seventh amplifiers, respectively, are inputted to the second channel selector 4j. The second channel selector 4j selects one of the video signals from the second to seventh amplifiers 4d to 4i in accordance with the selection signal "B" outputted from the logic circuit section 6, and outputs the selected video signal to the multiplexer 4k.

Figure 6A:
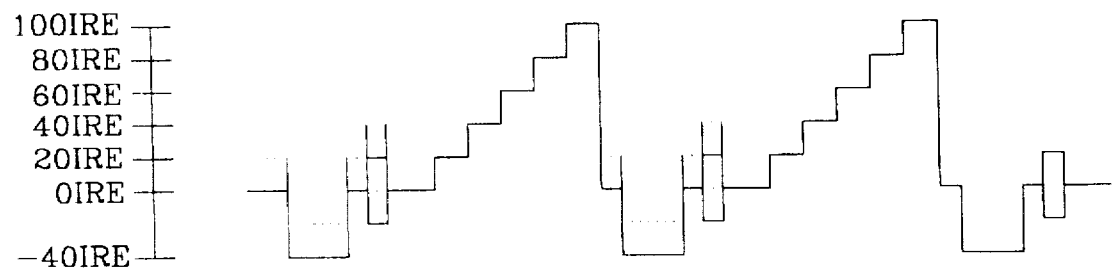
FIGS. 6A to 6C are waveform diagrams explaining the level shifting state of the sync signal in accordance with the present invention.
Figure 6B:
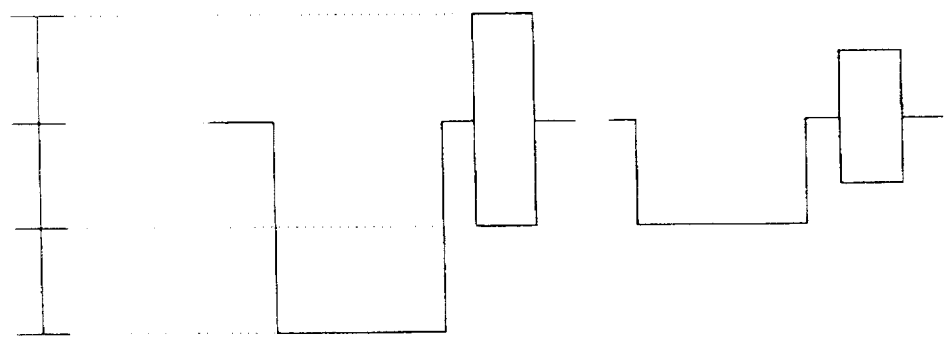
Figure 6C:
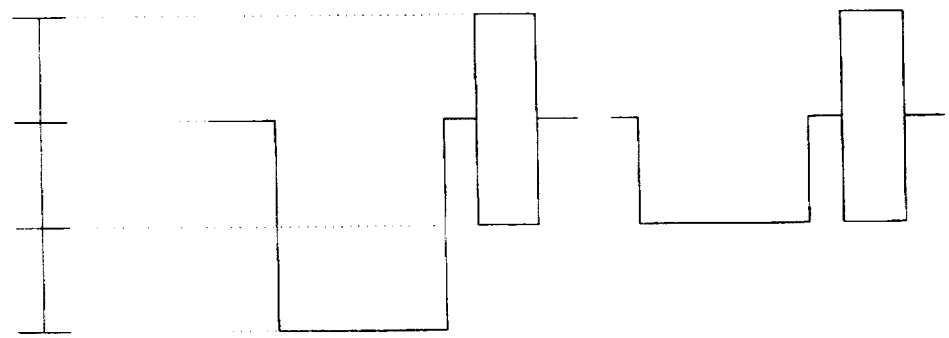

The multiplexer 4k selects one of the two video signals inputted thereto in accordance with the selection signal provided from the logic circuit section 6, resulting in that the DC level of the sync signal is shifted as shown in FIGS. 6A to 6C or the sync signal is inverted as shown in FIGS. 7A to 7F. Accordingly, a predetermined period of the sync signal is selectively reversed, and the synchronizing operation in the video receiver is destroyed, causing a normal viewing of the video signal to be impossible.

Further, in order to prevent the unwarranted viewing, the broadcasting station may change the inversion level of the sync signal of the video signal from time to time.

Figure 7A:
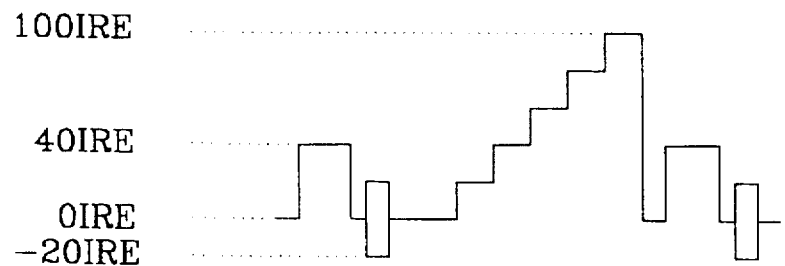
Figure 7B:
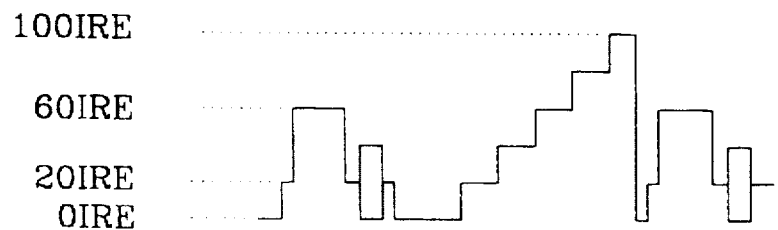
Figure 7C:
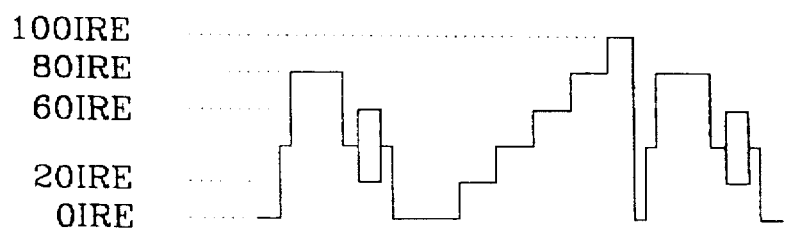
Figure 7D:
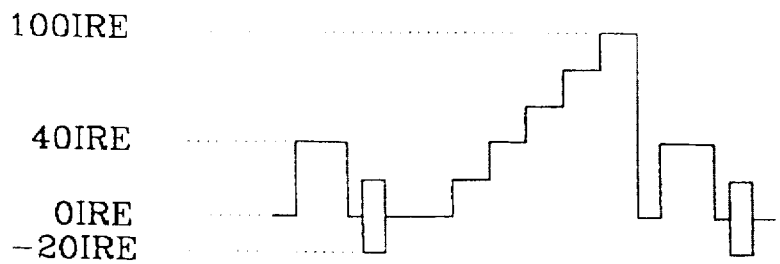
Figure 7E:
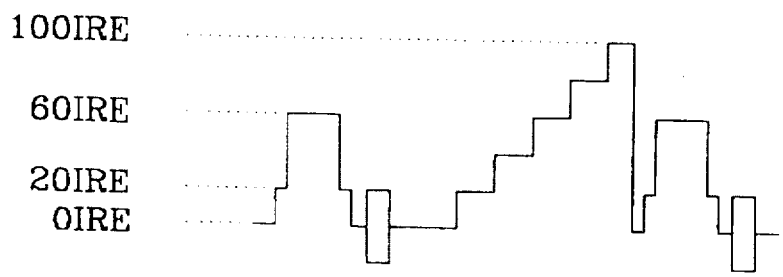
Figure 7F:
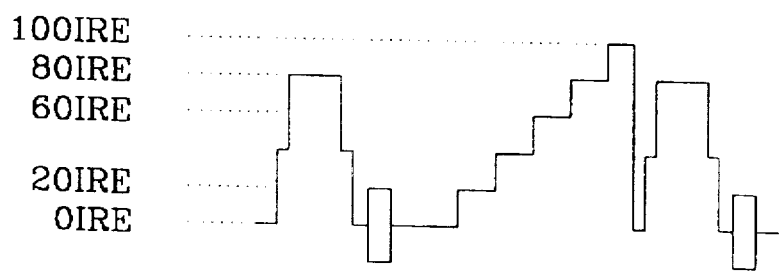

FIG. 7A illustrates the video signal in which the sync signal of 0IRE is inverted in a wide mode. FIG. 7B illustrates the video signal in which the sync signal level-shifted by 20IRE is inverted in a wide mode, and FIG. 7C illustrates the video signal in which the sync signal level-shifted by 40IRE is inverted in a wide mode. FIG. 7D illustrates the video signal in which the sync signal of 0IRE is inverted in a narrow mode, FIG. 7E illustrates the video signal in which the sync signal level-shifted by 20IRE is inverted in a narrow mode, and FIG. 7F illustrates the video signal in which the sync signal level-shifted by 40IRE is inverted.

Meanwhile, the scrambled video signal in which the DC level of the sync signal is level-shifted or the sync signal is inverted, and which is outputted from the multi-level shifter and inverter 4, is non-inversion-amplified by a predetermined level by the amplifying section 5, and then inputted to the sync signal attenuator and selector 18.

The sync signal attenuator and selector 18 inverts or shifts the sync signal in accordance with the control signal provided from the logic circuit section 6 to perform another scrambling mode.

Specifically, as shown in FIG. 4, the sync signal attenuator and selector 18 selectively attenuates the sync signal in such a manner that the first to third amplifier 18a to 18c in the sync signal attenuator and selector 18 amplify the video signal outputted from the third amplifying section 5 with the predetermined amplification factors, respectively.

The output signal of the first amplifier 18a is directly inputted to the multiplexer 18e. The video signals attenuated by and outputted from the second and third amplifiers 18b and 18c, respectively, are inputted to the channel selector 18d, and one of the video signals is selected by the channel selector 18d in accordance with the selection signal "D" outputted from the logic circuit section 6.

The multiplexer 18e selects one of the video signals outputted from the first amplifier 18a and the channel selector 18d in accordance with the selection signal provided from the logic circuit section 6, and the selected video signal is non-inversion-amplified by the fourth amplifier 18f, resulting in that the sync signal is attenuated, inverted or level-shifted.

FIG. 6B illustrates the horizontal sync signal and the color burst signal in which the normal horizontal sync signal is attenuated by half in a wide mode, and FIG. 6C illustrates the horizontal sync signal in which the normal sync signal is attenuated by half in a narrow mode.

As the sync signal is attenuated, the horizontal synchronization is destroyed, causing a normal viewing of the video signal to be impossible.

The video signal in which the sync signal is attenuated is inputted to the multiple artificial sync generator 13, so that an artificial sync signal is inserted into the video signal by the multiple artificial sync generator 13.

Specifically, the multiple artificial sync generator 13 inserts the artificial sync signal into the front porch or the back porch of the sync signal as shown in FIGS. 5E and 5F, to conflict with the normal sync signal.

For example, for a predetermined period, the insertion of the artificial sync signal into odd and even fields may be repeatedly performed such as from "ODD→FRONT PORCH, EVEN→BACK PORCH" TO "EVEN→FRONT PORCH, ODD→BACK PORCH".

Here, the number of cases for the insertion of the artificial sync signal may be given as follows:

1. ODD: F(5)+B(1)+F(5)+B(1)+F(5)+
   EVEN: B(5)+F(1)+B(5)+F(1)+B(5)+
2. ODD: F(1)+B(5)+F(1)+B(5)+F(1)+
   EVEN: B(1)+F(5)+B(1)+F(5)+B(1)+
3. Similar form to 1 or 2
4. ODD: F(5)+NS(1)+B(5)+NS(1)+B(5)+NS(1)+
   EVEN: B(5)+F(1)+B(5)+F(1)+B(5)+F(1)+
5. ODD: B(5)+F(1)+B(5)+F(1)+B(5)+F(1)+
   EVEN: F(5)+NS(1)+B(5)+NS(1)+B(5)+NS(1)+
6. ODD: F(5)+NS(1)+B(5)+NS(1)+B(5)+NS(1)+
   EVEN: B(5)+NS(1)+B(5)+NS(1)+B(5)+NS(1)+
7. Similar form to 4, 5, or 6
   EX) ODD: F(5)+B(5)+F(5)+B(5)+F(5)+
   EVEN: B(5)+F(5)+B(5)+F(5)+B(5)+
8. ODD: F(21→250) --+
   EVEN: B(265–520)--+ (repeat periodical change from F→B to B→22 F)

where,

F: front porch, B: back porch,
numeral in parenthesis: the number of sync signal lines.
ODD: field 1, EVEN: field 2,
NS: non-inversion sync pulse.

Figure 8:
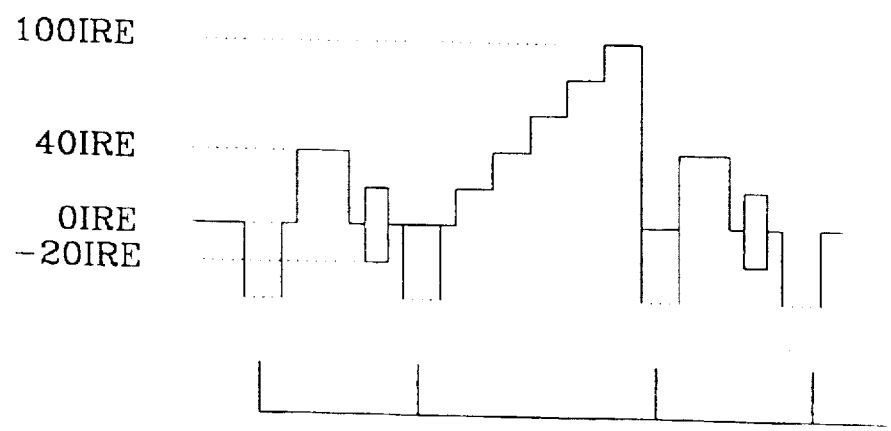
FIG. 8 is a waveform diagram explaining the insertion position of the artificial sync signal in accordance with the present invention.

FIG. 8 is a waveform diagram explaining the insertion position of the artificial sync signal in accordance with the present invention.

As the artificial sync signal is inserted into the blanking period of the video signal, the sync signal intervals in the sub-video signal become irregular when the video signal is received in a video receiver, and a normal viewing of the video signal will be impossible.

Further, the artificial sync signal inserted in the video signal serves to maintain the automatic gain control in a modulator or a converter to be uniform.

The video signal in which the artificial sync signal is inserted is amplified by the fourth amplifying section 14, and then applied to the multiplexer 15. The multiplexer 15 inserts the information for descrambling the scrambled video signal and the terminal control information, which are provided from the logic circuit section 6, into the video signal inputted thereto as shown in FIG. 5H. Generally, one or two lines among 10 to 20 lines of the sync sinal are used in inserting the above information. FIG. 5I shows the data pulse period wherein the data is inserted.

The data format of inband data which is inserted into the video signal may be represented as Inband Data Format START BIT(1 bit)+COMMAND BIT(2 bits)+TAG(1 byte)+FRAME COUNTER(5 bits)+SCRAMBLE MODE(6 bits)+ADDRESS(3 bytes)+CRC (1 byte)

Here, the start bit is always "0", and the command bit is set to be "11" in a 'scramble on' state, while to be "00" in a "scramble off" state. The tag contains an individual tag value of each program. The scramble mode is automatically changed every time when the frame counter counts 30 frames of the video signal.

The scramble mode may be represented as

STANDARD OR ARTIFICIAL SYNC(4 bits)+ INVERSION OR SYNC LEVEL SHIFT(1 bit)+ SUPPRESSION OR NOT(1 bit)

In the scramble mode of 4 bits, the first bit represents a start bit determining whether the start of the scrambling is a standard or artificial front sync signal. For example, the start bit of "0" represents a standard sync signal, while "1" represents an artificial sync signal. The second bit of the scramble mode represents a wide mode or a narrow mode, and the third and fourth bits represent the number of the standard sync signal lines.

The repeated format of the standard or artificial sync signal is given as

AF+S+AB+S+AF where,

AF: artificial front porch

AB: artificial back porch

S: standard sync signal

AF or AB: S+4 lines

The 'inversion or sync level shift' of "0" represents inversion, while "1" represents suppression. The 'suppression or not' of "0" represents suppression, while "1" represents no suppression.

The video signal into which the inband data as described above is inserted is inputted to the low-pass filter 16, and is filtered therethrough to remove the noise occurring during the signal processing. The filtered video signal is then non-inversion-amplified to be outputted as a scrambled video signal.

From the foregoing, it will be apparent that the video signal scrambling apparatus according to the present invention provides advantages in that it prevents nonsubscribers from viewing the scrambled video signal and the unwarranted descrambling of the scrambled signal by scrambling the standard video signal by attenuation and/or by insertion of an artificial sync signal into the standard video signal. Further, it can provide selective video services to the subscribers by differentiating the level of the sync signal.

While the present invention has been described and illustrated herein with reference to the preferred embodiment thereof, it will be understood by those skilled in the art that various changes in form and details may be made therein without departing from the spirit and scope of the invention.

What is claimed is:

1. A video signal scrambling apparatus comprising:

an automatic gain control and sync corrector for controlling a gain of an input video signal and maintaining a sync signal of said video signal constant;

a sync separator for separating a horizontal/vertical sync signal from said video signal provided from said automatic gain control and sync corrector;

logic circuit means for producing a video selection signal and control signals in response to said sync signal provided from said sync separator;

sample-hold means for sampling and holding said video signal provided from said automatic gain control and sync corrector in accordance with said control signals provided from said logic circuit means to maintain a DC offset of said video signal constant;

a multi-level shifter and inverter for inverting or level-shifting said sync signal of said video signal provided from said sample-hold means in accordance with said control signals provided from said logic circuit means;

a sync signal attenuator and selector for level-shifting said sync signal of said video signal provided from said multi-level shifter and inverter by attenuation or conversion of said sync signal;

a multiple artificial sync generator for generating and inserting an artificial sync signal into said video signal provided from said sync signal attenuator and selector;

a multiplexer for inserting information for descrambling said video signal outputted from said multiple artificial sync generator and terminal control information provided from said logic circuit means into said video signal outputted from said multiple artificial sync generator;

a low-pass filter for filtering said video signal provided from said multiplexer to remove noise components from said video signal; and amplifying means for non-inversion-amplifying said video signal provided from said low-pass filter to provide said amplified video signal as a scrambled video signal.

2. A video signal scrambling apparatus as claimed in claim 1, wherein said multi-level shifter and inverter comprises:

a multistage multiplexer for inserting reference signals into predetermined respective lines of said video signal outputted from said sample-hold means, respectively;

a first channel selector for selecting one of output signals of said multistage multipexer;

a first amplifier for amplifying and buffering an output signal of said first channel selector;

second to seventh amplifiers for amplifying an output signal of said first channel selector with offset-adjusted amplification factors, respectively;

a second channel selector for selecting one of output signals of said second to seventh amplifiers; and a multiplexer for level-shifting or inverting output signals of said first amplifier and said channel selector, respectively, in accordance with said video selection signal provided from said logic circuit means.

3. A video signal scrambling apparatus as claimed in claim 1, wherein said sync signal attenuator and selector comprises:

first to third amplifiers for amplifying said video signal outputted from said multi-level shifter and inverter with predetermined amplification factors, respectively, to selectively attenuate said video signal;

a channel selector for selecting one of said video signals respectively attenuated and outputted from said second and third amplifiers;

a multiplexer for selecting one of an output signal of said first amplifier and an output signal of said channel selector in accordance with said video selection signal outputted from said logic circuit means; and a fourth amplifier for non-inversion-amplifying an output signal of said multiplexer.

4. A video signal scrambling apparatus as claimed in claim 1, further comprising:

a first amplifying means for non-inversion-amplifying said video signal provided from said automatic gain control and sync corrector to provide said amplified video signal to said sync separator;

a second amplifying means for amplifying said video signal provided from said sample-hold means to provide said amplified video signal to said multi-level shifter and inverter;

a third amplifying means for non-inversion-amplifying said video signal provided from said multi-level shifter and inverter to provide said amplified video signal to said sync signal attenuator and selector; and a fourth amplifying means for non-inversion-amplifying said video signal provided from said multiple artificial sync generator to provide said amplified video signal to said multiplexer.

5. A video signal scrambling apparatus as claimed in claim 1, wherein said multi-level shifter and inverter inverts a horizontal sync signal and/or a color burst signal of said video signal inputted thereto.

6. A video signal scrambling apparatus as claimed in claim 1, wherein said multiple artificial sync generator inserts said artificial sync signal into a front porch or a back porch of said sync signal.

7. A video signal scrambling apparatus as claimed in claim 1, wherein said multiplexer inserts said information data into a tenth of said sync signal or a specific line of a vertical period.

* * * * *